United States Patent
Suzuki (10) Patent No.: US 11,297,452 B2
(45) Date of Patent: Apr. 5, 2022

(54) INSPECTION SYSTEM AND INSPECTION METHOD

(71) Applicant: SUBARU CORPORATION, Tokyo (JP)

(72) Inventor: Mototsugu Suzuki, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 0 days.

(21) Appl. No.: 16/993,547

(22) Filed: Aug. 14, 2020

(65) Prior Publication Data

US 2022/0053279 A1 Feb. 17, 2022

(51) Int. Cl.
*H04R 29/00* (2006.01)
*B60R 11/02* (2006.01)
*H04R 5/027* (2006.01)
*H04R 5/04* (2006.01)

(52) U.S. Cl.
CPC ........ *H04R 29/001* (2013.01); *B60R 11/0217* (2013.01); *B60R 11/0247* (2013.01); *H04R 5/027* (2013.01); *H04R 5/04* (2013.01); *H04R 2499/13* (2013.01)

(58) Field of Classification Search
None
See application file for complete search history.

(56) References Cited

U.S. PATENT DOCUMENTS

| | | | | |
|---|---|---|---|---|
| 5,361,305 A * | 11/1994 | Easley | ................... | H04B 1/082 381/58 |
| 6,950,525 B2 * | 9/2005 | Harrell | ................. | H04R 29/001 324/503 |
| 6,957,134 B2 * | 10/2005 | Ramseyer | ............ | H04R 29/001 381/58 |
| 2004/0153224 A1 * | 8/2004 | Ramseyer | ............ | H04R 29/001 701/32.8 |
| 2004/0240676 A1 * | 12/2004 | Hashimoto | ............. | H04S 7/305 381/56 |
| 2005/0069153 A1 * | 3/2005 | Hall | ........................ | H04S 7/307 381/103 |
| 2005/0100174 A1 * | 5/2005 | Howard | .................... | H04S 7/30 381/86 |
| 2005/0265560 A1 * | 12/2005 | Haulick | ................... | H04R 3/02 381/58 |

(Continued)

FOREIGN PATENT DOCUMENTS

JP 2017-171193 A 9/2017

*Primary Examiner* — Qin Zhu
(74) *Attorney, Agent, or Firm* — McDermott Will & Emery LLP (57) ABSTRACT

An inspection system includes two or more microphone units and an inspection controller. The two or more microphone units are disposed side by side in a vehicle. The inspection controller is configured to cause an inspection-target speaker to output an inspection sound, and determine, on the basis of a sound picked up by a main microphone unit and a sound picked up by one or more satellite microphone units, whether the inspection-target speaker passes or fails. The inspection-target speaker is any of one or more speakers mounted on the vehicle. The main microphone unit is one, of the microphone units, that is disposed at a position corresponding to a position of the inspection-target speaker. The one or more satellite microphone units are each one of the microphone units excluding the main microphone unit.

6 Claims, 9 Drawing Sheets

(56) References Cited

U.S. PATENT DOCUMENTS

| | | | |
|---|---|---|---|
| 2007/0086597 A1* | 4/2007 | Kino | H04S 7/301 381/59 |
| 2008/0031468 A1* | 2/2008 | Christoph | G10K 11/17833 381/71.2 |
| 2009/0136049 A1* | 5/2009 | Opfer | H04R 1/403 381/57 |
| 2009/0304193 A1* | 12/2009 | Hamilton | H04R 29/008 381/59 |
| 2015/0256928 A1* | 9/2015 | Mizuno | G01S 15/325 381/56 |
| 2020/0162819 A1* | 5/2020 | Inoue | H04R 1/025 |

* cited by examiner

FRONT MICROPHONE-UNIT DISTANCE (DISTANCE A10)
< REAR MICROPHONE-UNIT DISTANCE (DISTANCE A12)

| | | FIRST-ROW MICROPHONE UNIT INDIVIDUAL DETERMINATION | SECOND-ROW MICROPHONE UNIT INDIVIDUAL DETERMINATION | THIRD-ROW MICROPHONE UNIT INDIVIDUAL DETERMINATION | TOTAL DETERMINATION |
|---|---|---|---|---|---|
| INSPECTION TARGET | SPEAKER IN FIRST ROW | PASS | PASS | PASS | PASSING |
| | | PASS | PASS | FAIL | PASSING |
| | | PASS | FAIL | PASS | FAILING |
| | | PASS | FAIL | FAIL | FAILING |
| | | FAIL | FAIL | FAIL | FAILING |
| | | FAIL | FAIL | PASS | FAILING |
| | | FAIL | PASS | FAIL | FAILING |
| | | FAIL | PASS | PASS | FAILING |
| | SPEAKER IN SECOND ROW | PASS | PASS | PASS | PASSING |
| | | PASS | PASS | FAIL | PASSING |
| | | PASS | FAIL | PASS | FAILING |
| | | PASS | FAIL | FAIL | FAILING |
| | | FAIL | FAIL | FAIL | FAILING |
| | | FAIL | FAIL | PASS | FAILING |
| | | FAIL | PASS | FAIL | FAILING |
| | | FAIL | PASS | PASS | FAILING |
| | SPEAKER IN THIRD ROW | PASS | PASS | PASS | PASSING |
| | | PASS | PASS | FAIL | FAILING |
| | | PASS | FAIL | PASS | FAILING |
| | | PASS | FAIL | FAIL | FAILING |
| | | FAIL | FAIL | FAIL | FAILING |
| | | FAIL | FAIL | PASS | FAILING |
| | | FAIL | PASS | FAIL | FAILING |
| | | FAIL | PASS | PASS | PASSING |

FRONT MICROPHONE-UNIT DISTANCE (DISTANCE A10)
> REAR MICROPHONE-UNIT DISTANCE (DISTANCE A12)

| | | FIRST-ROW MICROPHONE UNIT INDIVIDUAL DETERMINATION | SECOND-ROW MICROPHONE UNIT INDIVIDUAL DETERMINATION | THIRD-ROW MICROPHONE UNIT INDIVIDUAL DETERMINATION | TOTAL DETERMINATION |
|---|---|---|---|---|---|
| INSPECTION TARGET | SPEAKER IN FIRST ROW | PASS | PASS | PASS | PASSING |
| | | PASS | PASS | FAIL | PASSING |
| | | PASS | FAIL | PASS | FAILING |
| | | PASS | FAIL | FAIL | FAILING |
| | | FAIL | FAIL | FAIL | FAILING |
| | | FAIL | FAIL | PASS | FAILING |
| | | FAIL | PASS | FAIL | FAILING |
| | | FAIL | PASS | PASS | FAILING |
| | SPEAKER IN SECOND ROW | PASS | PASS | PASS | PASSING |
| | | PASS | PASS | FAIL | FAILING |
| | | PASS | FAIL | PASS | FAILING |
| | | PASS | FAIL | FAIL | FAILING |
| | | FAIL | FAIL | FAIL | FAILING |
| | | FAIL | FAIL | PASS | FAILING |
| | | FAIL | PASS | FAIL | FAILING |
| | | FAIL | PASS | PASS | PASSING |
| | SPEAKER IN THIRD ROW | PASS | PASS | PASS | PASSING |
| | | PASS | PASS | FAIL | FAILING |
| | | PASS | FAIL | PASS | FAILING |
| | | PASS | FAIL | FAIL | FAILING |
| | | FAIL | FAIL | FAIL | FAILING |
| | | FAIL | FAIL | PASS | FAILING |
| | | FAIL | PASS | FAIL | FAILING |
| | | FAIL | PASS | PASS | PASSING |

FRONT MICROPHONE-UNIT DISTANCE (DISTANCE A10)
= REAR MICROPHONE-UNIT DISTANCE (DISTANCE A12)

| INSPECTION TARGET | | FIRST-ROW MICROPHONE UNIT INDIVIDUAL DETERMINATION | SECOND-ROW MICROPHONE UNIT INDIVIDUAL DETERMINATION | THIRD-ROW MICROPHONE UNIT INDIVIDUAL DETERMINATION | TOTAL DETERMINATION |
|---|---|---|---|---|---|
| | SPEAKER IN FIRST ROW | PASS | PASS | PASS | PASSING |
| | | PASS | PASS | FAIL | PASSING |
| | | PASS | FAIL | PASS | FAILING |
| | | PASS | FAIL | FAIL | FAILING |
| | | FAIL | FAIL | FAIL | FAILING |
| | | FAIL | FAIL | PASS | FAILING |
| | | FAIL | PASS | FAIL | FAILING |
| | | FAIL | PASS | PASS | FAILING |
| | SPEAKER IN SECOND ROW | PASS | PASS | PASS | PASSING |
| | | PASS | PASS | FAIL | PASSING |
| | | PASS | FAIL | PASS | FAILING |
| | | PASS | FAIL | FAIL | FAILING |
| | | FAIL | FAIL | FAIL | FAILING |
| | | FAIL | FAIL | PASS | FAILING |
| | | FAIL | PASS | FAIL | FAILING |
| | | FAIL | PASS | PASS | PASSING |
| | SPEAKER IN THIRD ROW | PASS | PASS | PASS | PASSING |
| | | PASS | PASS | FAIL | FAILING |
| | | PASS | FAIL | PASS | FAILING |
| | | PASS | FAIL | FAIL | FAILING |
| | | FAIL | FAIL | FAIL | FAILING |
| | | FAIL | FAIL | PASS | FAILING |
| | | FAIL | PASS | FAIL | FAILING |
| | | FAIL | PASS | PASS | PASSING |

FIG. 6

| | FIRST-ROW MICROPHONE UNIT INDIVIDUAL DETERMINATION | SECOND-ROW MICROPHONE UNIT INDIVIDUAL DETERMINATION | THIRD-ROW MICROPHONE UNIT INDIVIDUAL DETERMINATION | TOTAL DETERMINATION |
|---|---|---|---|---|
| SPEAKER IN FIRST ROW | PASS | PASS | PASS | PASSING |
| | PASS | PASS | FAIL | PASSING |
| | PASS | FAIL | PASS | PASSING |
| | PASS | FAIL | FAIL | FAILING |
| | FAIL | FAIL | FAIL | FAILING |
| | FAIL | FAIL | PASS | FAILING |
| | FAIL | PASS | FAIL | FAILING |
| | FAIL | PASS | PASS | FAILING |
| SPEAKER IN SECOND ROW | PASS | PASS | PASS | PASSING |
| | PASS | PASS | FAIL | PASSING |
| | PASS | FAIL | PASS | FAILING |
| | PASS | FAIL | FAIL | FAILING |
| | FAIL | FAIL | FAIL | FAILING |
| | FAIL | FAIL | PASS | FAILING |
| | FAIL | PASS | FAIL | FAILING |
| | FAIL | PASS | PASS | PASSING |
| SPEAKER IN THIRD ROW | PASS | PASS | PASS | PASSING |
| | PASS | PASS | FAIL | FAILING |
| | PASS | FAIL | PASS | PASSING |
| | PASS | FAIL | FAIL | FAILING |
| | FAIL | FAIL | FAIL | FAILING |
| | FAIL | FAIL | PASS | FAILING |
| | FAIL | PASS | FAIL | FAILING |
| | FAIL | PASS | PASS | PASSING |

INSPECTION TARGET

INSPECTION SYSTEM AND INSPECTION METHOD

BACKGROUND

The technology relates to an inspection system and an inspection method that inspect a speaker mounted on a vehicle.

For example, Japanese Unexamined Patent Application Publication (JP-A) No. 2017-171193 discloses a method of inspecting, upon completion of a vehicle, a speaker mounted on the vehicle. In the inspection method disclosed in JP-A No. 2017-171193, a single pickup microphone having variable directivity is disposed in a vehicle compartment. An inspection-target speaker is caused to output an inspection sound, and the pickup microphone is caused to pick up the outputted inspection sound. Whether the speaker passes or fails is determined on the basis of the picked-up sound in the inspection method disclosed in JP-A No. 2017-171193.

SUMMARY

An aspect of the technology provides an inspection system that includes two or more microphone units and an inspection controller. The two or more microphone units are disposed side by side in a vehicle. The inspection controller is configured to cause an inspection-target speaker to output an inspection sound, and determine, on the basis of a sound picked up by a main microphone unit and a sound picked up by one or more satellite microphone units, whether the inspection-target speaker passes or fails. The inspection-target speaker is any of one or more speakers mounted on the vehicle. The main microphone unit is one, of the microphone units, that is disposed at a position corresponding to a position of the inspection-target speaker. The one or more satellite microphone units are each one of the microphone units excluding the main microphone unit.

An aspect of the technology provides an inspection method including: causing an inspection-target speaker to output an inspection sound, the inspection-target speaker being any of one or more speakers mounted on a vehicle; and determining, on the basis of a sound picked up by a main microphone unit and a sound picked up by one or more satellite microphone units, whether the inspection-target speaker passes or fails, the main microphone unit being one, of two or more microphone units, that is disposed at a position corresponding to a position of the inspection-target speaker, the microphone units being disposed side by side in the vehicle, the one or more satellite microphone units each being one of the microphone units excluding the main microphone unit.

BRIEF DESCRIPTION OF THE DRAWINGS

The accompanying drawings are included to provide a further understanding of the disclosure, and are incorporated in and constitute a part of this specification. The drawings illustrate embodiments and, together with the specification, serve to explain the principles of the disclosure.

DETAILED DESCRIPTION

In the following, some example embodiments of the technology are described in detail with reference to the accompanying drawings. Note that the following description is directed to illustrative examples of the disclosure and not to be construed as limiting to the technology. In each of the drawings referred to in the following description, elements have different scales in order to illustrate the respective elements with sizes recognizable in the drawings. Therefore, factors including, without limitation, a dimension of each of the elements, a material of each of the elements, the number of each of the elements, the shape of each of the elements, a size of each of the elements, a ratio between the elements, relative positional relationship between the elements, and any other specific numeral value related to each of the elements are illustrative only and not to be construed as limiting to the technology. Further, elements in the following example embodiments which are not recited in a most-generic independent claim of the disclosure are optional and may be provided on an as-needed basis. Throughout the present specification and the drawings, elements having substantially the same function and configuration are denoted with the same numerals to avoid any redundant description.

First Example Embodiment

Figure 1:
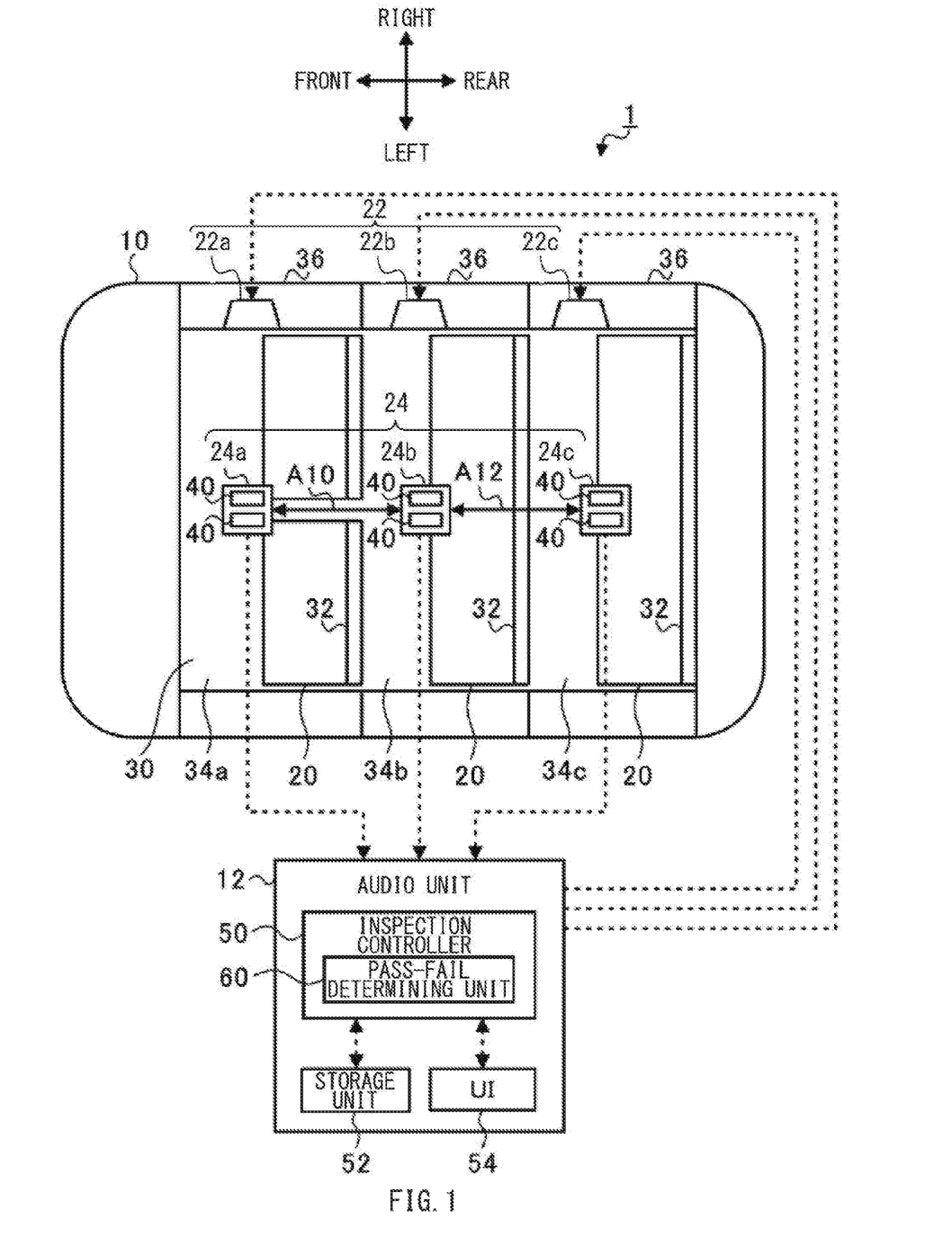
FIG. 1 is a schematic diagram illustrating an example of a configuration of an inspection system according to one example embodiment of the technology.

FIG. 1 schematically illustrates a configuration of an inspection system 1 according to a first example embodiment of the technology. The inspection system 1 may include a vehicle 10 and an audio unit 12. FIG. 1 illustrates the vehicle 10 from above in a perspective manner for description purpose. The vehicle 10 may include seats 20, two or more speakers 22, and two or more microphone units 24. The speakers 22 may include a speaker 22a, a speaker 22b, and a speaker 22c. The speakers 22a, 22b, and 22c are each sometimes referred to as the speaker 22. The microphone units 24 may include a microphone unit 24a, a microphone unit 24b, and a microphone unit 24c. The microphone units 24a, 24b, and 24c are each sometimes referred to as the microphone unit 24.

The seats 20 may be disposed in a vehicle compartment 30 in three rows in a front-rear direction of the vehicle 10. The seats 20 may each include a backrest 32. The backrest 32 may be disposed at a rear part of the seat 20 and support an occupant such as a driver or a passenger.

The vehicle compartment 30 may have a space that is sectioned into three rows by the backrests 32. The backrest 32 of the seat 20 in a first row may separate a first-row space (i.e., a front-row space) and a second-row space (i.e., a middle-row space) from each other. The backrest 32 of the seat 20 in a second row may separate the second-row space (i.e., the middle-row space) and a third-row space (i.e., a rear-row space) from each other.

Hereinafter, a space on front side of the backrest 32 of the seat 20 in the first row, i.e., the first-row space, is sometimes referred to as a "first space 34a". A space between the backrest 32 of the seat 20 in the first row and the backrest 32 of the seat 20 in the second row, i.e., the second-row space, is sometimes referred to as a "second space 34b". A space on rear side of the backrest 32 of the seat 20 in the second row, i.e., the third-row space, is sometimes referred to as a "third space 34c". The first space 34a, the second space 34b, and the third space 34c in the vehicle compartment 30 may be in communication with each other in a region over the backrests 32 in a vertical direction.

The speakers 22a, 22b, and 22c may each have a sound-emitting surface directed toward inner side of the vehicle compartment 30. The speaker 22a may be disposed on a door 36 in the first row, thus corresponding to the first space 34a, i.e., the first row. The speaker 22b may be disposed on a door 36 in the second row, thus corresponding to the second space 34b, i.e., the second row. The speaker 22c may be disposed on a door 36 in the third row, thus corresponding to the third space 34c, i.e., the third row.

Note that the number of the speakers 22 is not limited to three, and any number of speakers 22 may be provided accordingly. Further, the speakers 22 are each not necessarily disposed on the door 36, and the speakers 22 may each be disposed at any position in the vehicle 10.

The inspection system 1 performs an inspection of the speakers 22 mounted on the vehicle 10. The inspection of the speakers 22 may involve confirming whether the speakers 22 are each able to appropriately generate or output a predetermined inspection sound. Upon the inspection, first, a single speaker 22 to be inspected may be set among the speakers 22. The speaker 22 to be inspected is sometimes referred to as an "inspection-target speaker 22". Thereafter, the set inspection-target speaker 22 is caused to output the inspection sound. In a case where appropriate output of the inspection sound from the inspection-target speaker 22 is confirmed, it may be determined that the inspection-target speaker 22 passes. In a case where output of the inspection sound is not confirmed or in a case where a confirmed sound is different from the inspection sound, it may be determined that the inspection-target speaker 22 fails. Thereafter, a target of the inspection may be changed from one speaker 22 to another, thereby sequentially causing all of the speakers 22 to be determined as passing or failing. The inspection system 1 may perform the inspection of the speakers 22 through the microphone units 24, i.e., the microphone units 24a, 24b, and 24c, mounted on the vehicle 10.

The microphone units 24a, 24b, and 24c may each be disposed in the vehicle compartment 30. In one non-limiting example, the microphone units 24a, 24b, and 24c may be disposed on an inner surface of a roof. The microphone unit 24a may be disposed in a region, of the roof, that opposes the first space 34a, thus corresponding to the first space 34a, i.e., the first row. The microphone unit 24b may be disposed in a region, of the roof, that opposes the second space 34b, thus corresponding to the second space 34b, i.e., the second row. The microphone unit 24c may be disposed in a region, of the roof, that opposes the third space 34c, thus corresponding to the third space 34c, i.e., the third row.

The microphone units 24 may be disposed for the respective spaces in the respective rows sectioned by the backrests 32. The microphone units 24 may each be disposed at any position within the corresponding space, i.e., within the corresponding row.

The microphone units 24 may each include two microphone elements 40. The two microphone elements 40 may each be configured to pick up a sound around the microphone element 40. The microphone units 24 may each be configured to cause the two microphone elements 40 to operate in conjunction with each other, thereby identifying a sound from a desired direction with higher sensitivity compared with a sound from a direction other than the desired direction. That is, the microphone units 24 may each have a variable direction of directivity.

For example, a sound from a sound source reaches earlier the microphone element 40 that is closer, of the two microphone elements 40, to the sound source than the microphone element 40 that is farther, of the two microphone elements 40, to the sound source. Accordingly, the sound picked up by the microphone element 40 that is closer to the sound source, i.e., a preceding sound, may be subjected to a delay process, and the processed sound may be added to the sound picked up by the microphone element 40 that is farther from the sound source, i.e., a following sound. If an appropriate time to delay the preceding sound is set on the basis of a position of the sound source, a phase of the preceding sound matches a phase of the following sound. This allows each of the microphone units 24 to identify a sound from a direction of orientation of the sound source with higher sensitivity, compared with a sound from another direction out of the sounds picked up by each of the microphone units 24.

The audio unit 12 may include an inspection controller 50, a storage unit 52, and a user interface 54. Note that the user interface 54 is described as "UI" in FIG. 1.

The inspection controller 50 may include a semiconductor integrated circuit that includes, without limitation, a central processing unit (CPU), a read-only memory (ROM), and a random-access memory (RAM). The ROM may hold, for example but not limited to, a program. The RAM may serve as a working area. The inspection controller 50 may execute the program to thereby serve as a pass-fail determining unit 60. In one embodiment, the inspection controller 50 may serve as an "inspection controller". In one embodiment, the pass-fail determining unit 60 may serve as a "pass-fail determining unit".

The pass-fail determining unit 60 may identify the inspection-target speaker 22, and cause the identified inspection-target speaker 22 to output the inspection sound. The pass-fail determining unit 60 may cause each of the microphone units 24 to pick up the inspection sound outputted by the inspection-target speaker 22. The pass-fail determining unit 60 may determine, on the basis of a part or all of the sounds picked up by the respective microphone units 24, whether the inspection-target speaker 22 passes or fails. A detailed description of the pass-fail determining unit 60 will be given later.

The storage unit 52 may be, for example, a non-volatile memory such as a flash memory or a hard disk drive. The storage unit 52 may hold various types of data related to the inspection. For example, the storage unit 52 may hold a waveform pattern, i.e., waveform data, of the inspection sound. Further, the storage unit 52 may hold a waveform pattern of the sound picked up by any of the microphone units 24, for example. Further, the storage unit 52 may hold a pass-fail result, for example.

The user interface 54 may assist input operation for, for example but not limited to, various settings related to the inspection. Further, the user interface 54 may cause the pass-fail result to be displayed on a display.

The pass-fail determining unit 60 may set, as a main microphone unit, one, of the microphone units 24, that is disposed in a space in a row corresponding to the position of the inspection-target speaker 22. For example, in a case where the speaker 22b disposed on the door 36 in the second row is to be inspected, the pass-fail determining unit 60 may set the microphone unit 24b in the second row as the main microphone unit.

The pass-fail determining unit 60 may set, as sub microphone units, the microphone units 24 in rows other than the row including the main microphone unit. For example, in a case where the microphone unit 24b in the second row is set as the main microphone unit, the pass-fail determining unit 60 may set the microphone unit 24a in the first row and the microphone unit 24c in the third row as the sub microphone units.

The pass-fail determining unit 60 may determine whether the inspection-target speaker 22 passes or fails with combined use of the main microphone unit and one or more sub microphone units provided in one or more rows out of the sub microphone units. The pass-fail determining unit 60 may set, as a satellite microphone unit, each of the one or more sub microphone units to be used to determine whether the inspection-target speaker 22 passes or fails.

The pass-fail determining unit 60 determines, on the basis of a sound picked up by the main microphone unit and a sound picked up by the one or more satellite microphone units, whether the inspection-target speaker 22 passes or fails. The satellite microphone unit may be disposed in a space in any of the rows other than the row including the main microphone unit.

In one specific but non-limiting example, the pass-fail determining unit 60 may set, as the satellite microphone unit, one, of the sub microphone units, that has a shortest distance to the main microphone unit. Further, the pass-fail determining unit 60 may determine that the inspection-target speaker 22 passes in a case where: the sound picked up by the main microphone unit satisfies a predetermined first passing condition; and the sound picked up by the satellite microphone unit satisfies a predetermined second passing condition.

Referring to FIG. 1, a distance A10 indicated by an arrow represents a front microphone-unit distance that is a distance from the microphone unit 24a in the first row to the microphone unit 24b in the second row. A distance A12 indicated by an arrow in FIG. 1 represents a rear microphone-unit distance that is a distance from the microphone unit 24b in the second row to the microphone unit 24c in the third row.

In one non-limiting example, the front microphone-unit distance (i.e., the distance A10) may be shorter than the rear microphone-unit distance (i.e., the distance A12).

In this example, in a case where the microphone unit 24a in the first row is set as the main microphone unit, the microphone unit 24b in the second row may be set as the satellite microphone unit. In a case where the microphone unit 24b in the second row is set as the main microphone unit, the microphone unit 24a in the first row may be set as the satellite microphone unit. In a case where the microphone unit 24c in the third row is set as the main microphone unit, the microphone unit 24b in the second row may be set as the satellite microphone unit.

Figure 2:
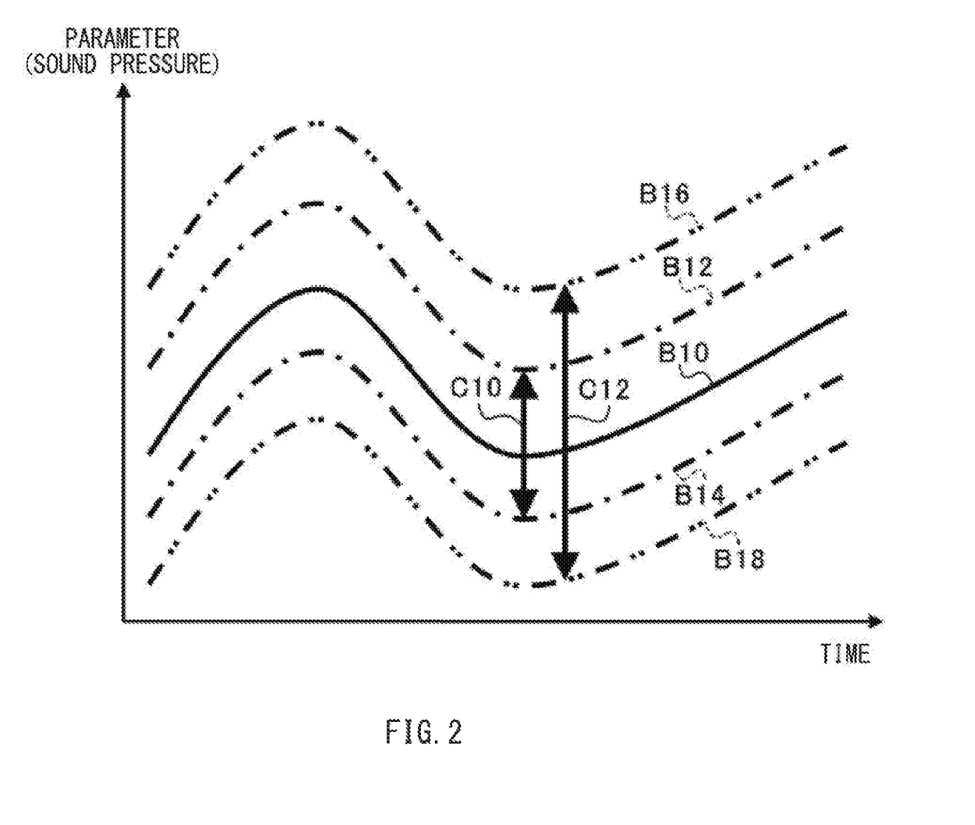
FIG. 2 is a diagram describing an example of a first passing condition and a second passing condition.

FIG. 2 describes an example of the first passing condition and the second passing condition. A parameter in FIG. 2 may be a factor, i.e., an acoustic characteristic, adapted to identify the inspection sound. Non-limiting examples of the parameter may include a sound pressure, i.e., loudness of a sound, and an interval, i.e., a frequency of a sound. Note that the parameter is not limited to the sound pressure or the interval and may be set appropriately to any other characteristic such as a sound receiving timing, i.e., a time lag from sound outputting to sound receiving. FIG. 2 illustrates transition of the sound pressure as one example of the parameter. The following description is given with reference to an example where the sound pressure is used as the parameter for a description purpose; however, the first passing condition and the second passing condition may be set on the basis of any other parameter such as the interval in a manner similar to the example where the first passing condition and the second passing condition are set on the basis of the sound pressure.

A solid line B10 indicates transition of a sound pressure of the inspection sound. A one-dot chain line B12 indicates transition of an upper-limit passing value of a sound pressure of the sound picked up by the main microphone unit. A one-dot chain line B14 indicates transition of a lower-limit passing value of the sound pressure of the sound picked up by the main microphone unit. A two-dot chain line B16 indicates transition of an upper-limit passing value of a sound pressure of the sound picked up by the satellite microphone unit. A two-dot chain line B18 indicates transition of a lower-limit passing value of the sound pressure of the sound picked up by the satellite microphone unit. The upper-limit and the lower-limit passing values for the main microphone unit and the upper-limit and the lower-limit passing values for the satellite microphone unit may each be set in advance for each of the parameters.

An arrow C10 indicates a width from the lower-limit passing value for the main microphone unit to the upper-limit passing value for the main microphone unit. That is, the arrow C10 may be an allowable passing range for the main microphone unit. For example, satisfying the first passing condition means that a parameter of the sound picked up by the main microphone unit falls within the allowable passing range for the main microphone unit. In a case where the sound picked up by the main microphone unit satisfies the first passing condition, an individual determination based on the main microphone unit may result in passing.

An arrow C12 indicates a width from the lower-limit passing value for the satellite microphone unit to the upper-limit passing value for the satellite microphone unit. That is, the arrow C12 may be an allowable passing range for the satellite microphone unit. For example, satisfying the second passing condition means that a parameter of the sound picked up by the satellite microphone unit falls within the allowable passing range for the satellite microphone unit. In a case where the sound picked up by the satellite microphone unit satisfies the second passing condition, an individual determination based on the satellite microphone unit may result in passing.

The upper-limit passing value for the satellite microphone unit indicated by the two-dot chain line B16 may be set higher than the upper-limit passing value for the main microphone unit indicated by the one-dot chain line B12. The lower-limit passing value for the satellite microphone unit indicated by the two-dot chain line B18 may be set lower than the lower-limit passing value for the main microphone unit indicated by the one-dot chain line B14.

Accordingly, the allowable passing range for the satellite microphone unit indicated by the arrow C12 may be greater than the allowable passing range for the main microphone unit indicated by the arrow C10. In other words, the second passing condition may have the allowable passing range that is greater than the allowable passing range of the first passing condition. One reason for this is that the satellite microphone unit has a longer distance to the sound source of the inspection sound compared with the main microphone unit, making it easier for the sound picked up by the satellite microphone unit to include a noise compared with the sound picked up by the main microphone unit.

Figure 3:
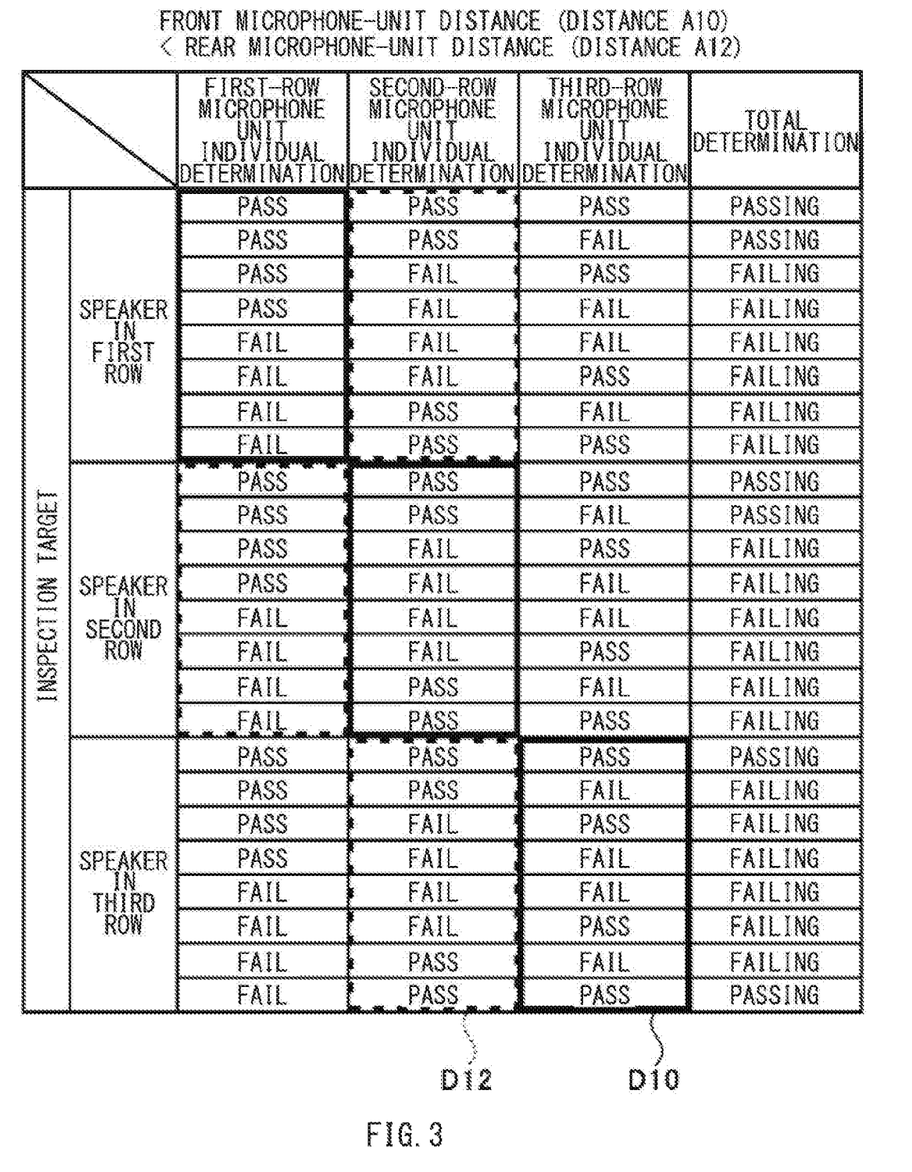
FIG. 3 is a diagram describing an example of a relationship between individual determination results based on respective microphone units and a total determination result according to one example embodiment.

FIG. 3 describes an example of a relationship between individual determination results based on the respective microphone units 24 and a total determination result according to the first example embodiment. FIG. 3 describes an example where the front microphone-unit distance (i.e., the distance A10 illustrated in FIG. 1) is shorter than the rear microphone-unit distance (i.e., the distance A12 illustrated in FIG. 1). In FIG. 3, thick solid-line frames D10 each represent an individual determination result based on the main microphone unit. Dashed-line frames D12 each represent an individual determination result based on the satellite microphone unit. "PASS" represents that the individual determination results in passing. "FAIL" represents that the individual determination results in failing.

Referring to the example illustrated in FIG. 3, in a case where the speaker 22a in the first row is to be inspected, the microphone unit 24a in the first row may be set as the main microphone unit, and the microphone unit 24b in the second row may be set as the satellite microphone unit. In this case, the inspection-target speaker 22a may be determined as "passing" in the total determination only when: the individual determination result based on the microphone unit 24a in the first row set as the main microphone unit is "PASS"; and the individual determination result based on the microphone unit 24b in the second row set as the satellite microphone unit is "PASS". In this case, the total determination result for the inspection-target speaker 22a may be independent of the individual determination result based on the microphone unit 24c in the third row which is the sub microphone unit.

In a case where the speaker 22b in the second row is to be inspected, the microphone unit 24b in the second row may be set as the main microphone unit, and the microphone unit 24a in the first row may be set as the satellite microphone unit. In this case, the inspection-target speaker 22b may be determined as "passing" in the total determination only when: the individual determination result based on the microphone unit 24b in the second row set as the main microphone unit is "PASS"; and the individual determination result based on the microphone unit 24a in the first row set as the satellite microphone unit is "PASS". In this case, the total determination result for the inspection-target speaker 22b may be independent of the individual determination result based on the microphone unit 24c in the third row which is the sub microphone unit.

In a case where the speaker 22c in the third row is to be inspected, the microphone unit 24c in the third row may be set as the main microphone unit, and the microphone unit 24b in the second row may be set as the satellite microphone unit. In this case, the inspection-target speaker 22c may be determined as "passing" in the total determination only when: the individual determination result based on the microphone unit 24c in the third row set as the main microphone unit is "PASS"; and the individual determination result based on the microphone unit 24b in the second row set as the satellite microphone unit is "PASS". In this case, the total determination result for the inspection-target speaker 22c may be independent of the individual determination result based on the microphone unit 24a in the first row which is the sub microphone unit.

In the example described in FIG. 3, the microphone units 24 may be so disposed that the front microphone-unit distance is shorter than the rear microphone-unit distance; however, this is non-limiting. In one example, the microphone units 24 may be so disposed that the front microphone-unit distance is longer than the rear microphone-unit distance.

Figure 4:
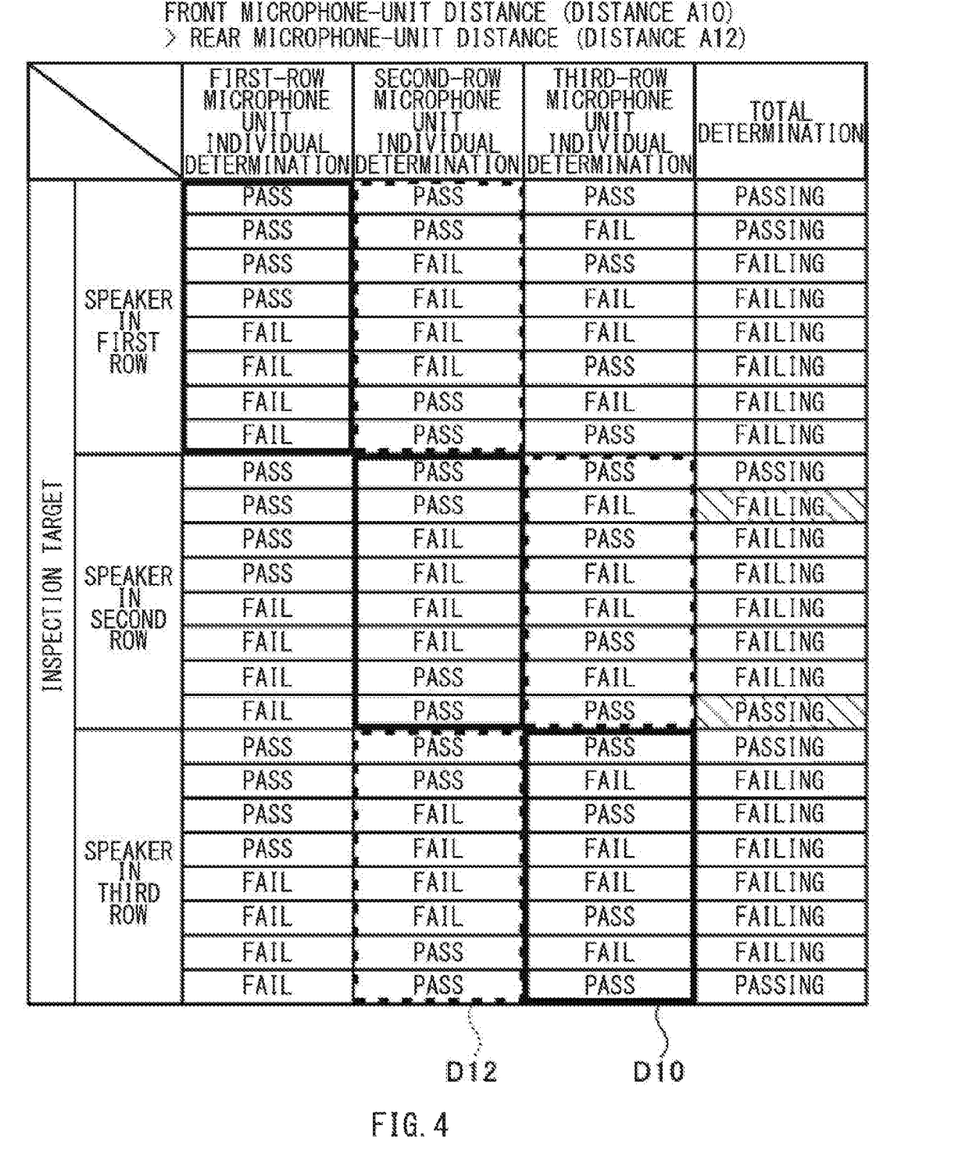
FIG. 4 is a diagram describing another example of the relationship between the individual determination results based on the respective microphone units and the total determination result according to one example embodiment.

FIG. 4 describes another example of the relationship between the individual determination results based on the respective microphone units 24 and the total determination result according to the first example embodiment. FIG. 4 describes an example where the front microphone-unit distance (i.e., the distance A10 illustrated in FIG. 1) is longer than the rear microphone-unit distance (i.e., the distance A12 illustrated in FIG. 1). In FIG. 4, the thick solid-line frames D10, the dashed-line frames D12, "PASS", and "FAIL" represent the same as those in FIG. 3. A total determination result in FIG. 4 different from that in FIG. 3 is hatched.

As described in FIG. 4, results in the case where the speaker 22a in the first row is to be inspected and in the case where the speaker 22c in the third row is to be inspected are similar to those described in FIG. 3.

In a case, however, where the speaker 22b in the second row is to be inspected, the microphone unit 24b in the second row may be set as the main microphone unit, and the microphone unit 24c in the third row may be set as the satellite microphone unit. In this case, the inspection-target speaker 22b may be determined as "passing" in the total determination only when: the individual determination result based on the microphone unit 24b in the second row set as the main microphone unit is "PASS"; and the individual determination result based on the microphone unit 24c in the third row set as the satellite microphone unit is "PASS". In this case, the total determination result for the inspection-target speaker 22b may be independent of the individual determination result based on the microphone unit 24a in the first row which is the sub microphone unit.

Figure 5:
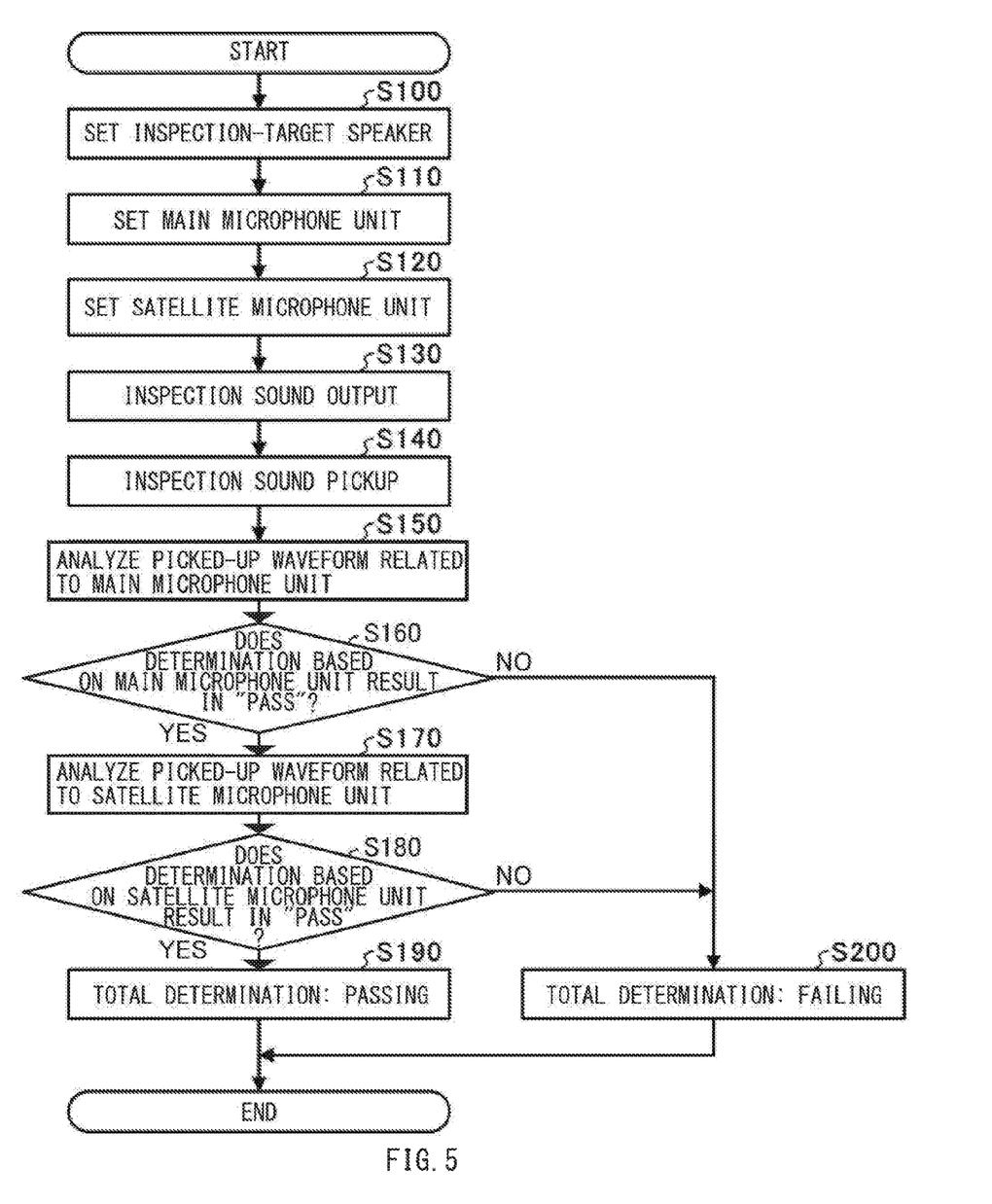
FIG. 5 is a flowchart describing an example of a flow of operation to be performed by a pass-fail determining unit according to one example embodiment.

FIG. 5 is a flowchart describing a flow of operation to be performed by the pass-fail determining unit 60 according to the first example embodiment. For example, the pass-fail determining unit 60 may perform a series of processes described in FIG. 5 upon receiving, via the user interface 54, an instruction to start an inspection. The pass-fail determining unit 60 may repeatedly perform the series of processes described in FIG. 5 every time when the inspection-target speaker 22 is changed from one of the speakers 22 to another of the speakers 22.

First, the pass-fail determining unit 60 may set the inspection-target speaker 22 among the speakers 22 (step S100). Thereafter, the pass-fail determining unit 60 may set, among the microphone units 24, the main microphone unit corresponding to the inspection-target speaker 22 (step S110). Upon setting the main microphone unit, the pass-fail determining unit 60 may set a direction of directivity of the main microphone unit to a direction in which the inspection-target speaker 22 is assumed to be present.

Thereafter, the pass-fail determining unit 60 may set the satellite microphone unit on the basis of the main microphone unit, the front microphone-unit distance, and the rear microphone-unit distance (step S120). Upon setting the satellite microphone unit, the pass-fail determining unit 60 may set a direction of directivity of the satellite microphone unit to the direction in which the inspection-target speaker 22 is assumed to be present. The front microphone-unit distance and the rear microphone-unit distance may be stored in advance in the storage unit 52.

Thereafter, the pass-fail determining unit 60 may cause the inspection-target speaker 22 to output the inspection sound (step S130). Thereafter, the pass-fail determining unit 60 may cause each of the microphone units 24 to pick up the outputted inspection sound (step S140).

Thereafter, the pass-fail determining unit 60 may analyze a waveform of the sound picked up by the microphone unit 24 set as the main microphone unit, and derive a parameter of the waveform of the picked-up sound (step S150). A waveform of a sound picked up by any of the microphone unit 24 is hereinafter referred to as a "picked-up waveform".

Thereafter, the pass-fail determining unit 60 may determine whether the individual determination based on the main microphone unit results in "PASS" (step S160). In one specific but non-limiting example, the pass-fail determining unit 60 may determine that the individual determination based on the main microphone unit results in "PASS" in a case where the parameter of the picked-up waveform related to the main microphone unit satisfies the first passing condition.

In a case where the individual determination based on the main microphone unit results in "PASS" (YES in step S160), the pass-fail determining unit 60 may analyze a waveform of the sound picked up by the microphone unit 24 set as the satellite microphone unit, i.e., a picked-up waveform related to the microphone unit 24 set as the satellite microphone unit, and derive a parameter of the picked-up waveform (step S170).

Thereafter, the pass-fail determining unit 60 may determine whether the individual determination based on the satellite microphone unit results in "PASS" (step S180). In one specific but non-limiting example, the pass-fail determining unit 60 may determine that the individual determination based on the satellite microphone unit results in "PASS" in a case where the parameter of the picked-up waveform related to the satellite microphone unit satisfies the second passing condition.

In a case where the individual determination based on the satellite microphone unit results in "PASS" (YES in step S180), the pass-fail determining unit 60 may determine that the inspection-target speaker 22 passes (step S190) and end the process.

In a case where the individual determination based on the main microphone unit results in "FAIL" in step S160 (NO in step S160), the pass-fail determining unit 60 may determine that the inspection-target speaker 22 fails (step S200) and end the process.

In a case where the individual determination based on the satellite microphone unit results in "FAIL" in step S180 (NO in step S180), the pass-fail determining unit 60 may determine that the inspection-target speaker 22 fails (step S200) and end the process.

In general, an inspection of a speaker mounted on a vehicle is often conducted under an environment with a lot of noises, such as in a factory. This causes a sound picked up by a sound pickup microphone to include a lot of noises. As a consequence, such a general speaker inspection according to a comparative example can lead to erroneous determination under an influence of the noises included in the picked-up sound. To address this, what is desired is to improve accuracy of an inspection, of a speaker, based on a picked-up sound.

In contrast to the comparative example, the inspection system 1 according to the first example embodiment determines whether the inspection-target speaker 22 passes or fails, on the basis of the sound picked up by the main microphone unit and the sound picked up by the satellite microphone unit, as described above. Accordingly, for example, upon inspecting an actually-failing speaker 22, even if the individual determination based on the main microphone unit results in "PASS" due to the influence of the noises, the individual determination based on the satellite microphone unit results in "FAIL", thereby causing the actually-failing speaker 22 to be determined as "failing" in the total determination. As described above, with the use of the inspection system 1 according to the first example embodiment, it is possible to reduce erroneous determination even under the environment with a lot of noises, compared to the comparative example.

Accordingly, it is possible to improve accuracy of an inspection of the speaker 22 mounted on the vehicle 10 with the use of the inspection system 1 according to the first example embodiment, compared to the comparative example.

In the inspection system 1 according to the first example embodiment, the microphone units 24 in two rows in total, i.e., the main microphone unit and the satellite microphone unit, may be used to determine whether the inspection-target speaker 22 passes or fails; however, this is non-limiting. In some embodiments, the microphone units 24 in three rows in total including the main microphone unit may be used to determine whether the inspection-target speaker 22 passes or fails.

Moreover, the inspection system 1 may utilize the microphone unit 24 mounted on the vehicle 10 to inspect the speaker 22. This makes it unnecessary to newly prepare an inspection-dedicated microphone unit 24, allowing for a simpler inspection.

Moreover, the seats 20 and the backrests 32 may each be so positioned and be so provided with a posture not as to disturb the output of the inspection sound from the speaker 22 or the pickup of the sound performed through the microphone unit 24. Accordingly, it is possible to further suppress a decrease in the accuracy of the inspection.

Second Example Embodiment

According to the first example embodiment, the description has been given of the example where the front microphone-unit distance and the rear microphone-unit distance are different from each other. In the following, a description is given of a second example embodiment where the front microphone-unit distance and the rear microphone-unit distance are equal to or substantially equal to each other.

Figure 6:
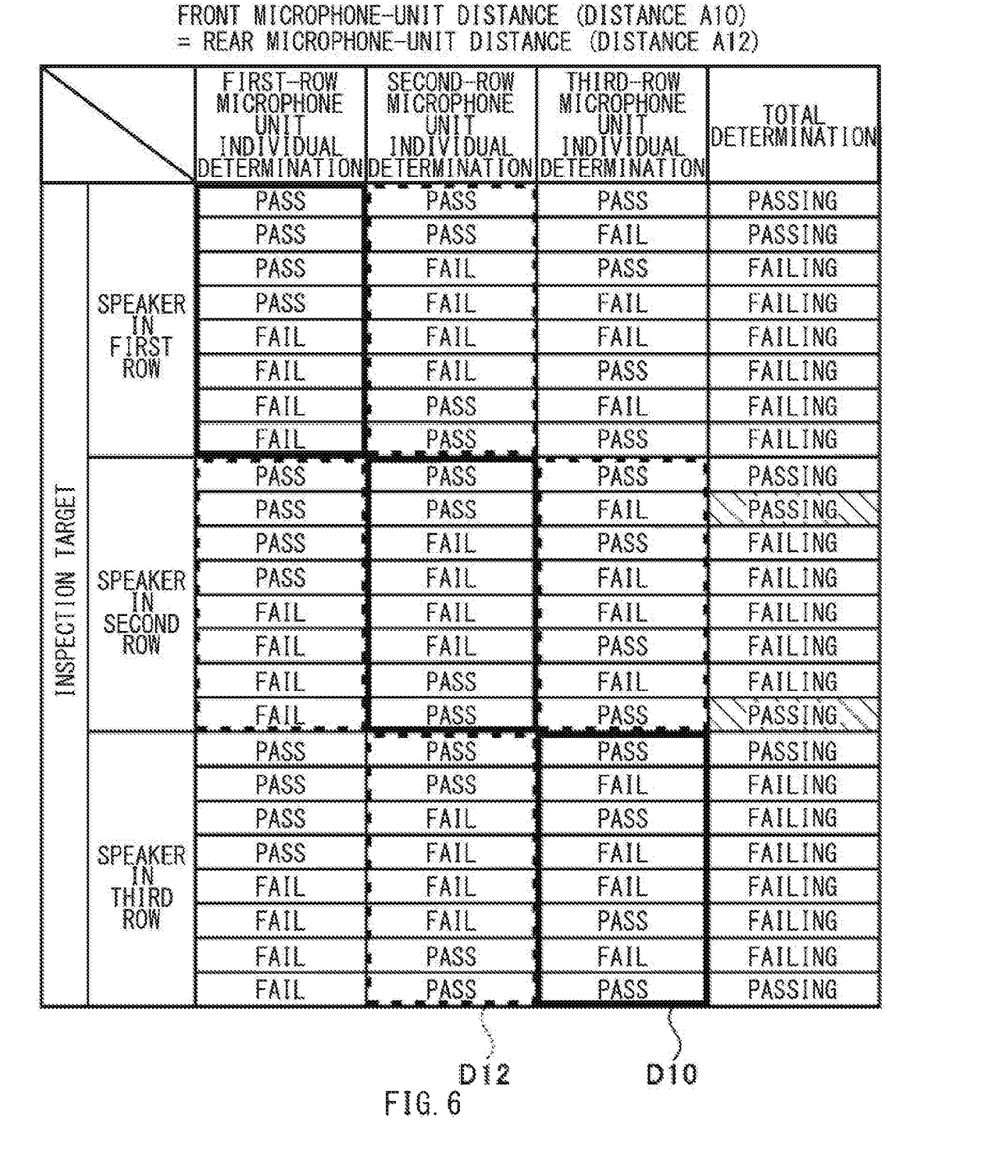
FIG. 6 is a diagram describing an example of a relationship between individual determination results based on the respective microphone units and a total determination result according to one example embodiment.

FIG. 6 describes an example of a relationship between individual determination results based on the respective microphone units 24 and a total determination result according to the second example embodiment. In FIG. 6, the thick solid-line frames D10, the dashed-line frames D12, "PASS", and "FAIL" represent the same in those in FIGS. 3 and 4. A total determination result in FIG. 6 different from that in FIG. 3 or 4 is hatched.

As described in FIG. 6, results in the case where the speaker 22a in the first row is to be inspected and in the case where the speaker 22c in the third row is to be inspected are similar to those described in FIG. 3 or 4.

Here, the satellite microphone unit that is adjacent to the main microphone unit on the front side of the main microphone unit is sometimes referred to as a "first satellite microphone unit". The satellite microphone unit that is adjacent to the main microphone unit on the rear side of the main microphone unit is sometimes referred to as a "second satellite microphone unit".

As described above, a distance from the main microphone unit to the first satellite microphone unit and a distance from the main microphone unit to the second satellite microphone unit may be the same or substantially the same as each other. In this case, the pass-fail determining unit 60 may determine that the inspection-target speaker 22 passes in a case where: the sound picked up by the main microphone unit satisfies the predetermined first passing condition; and a sound picked up by the first satellite microphone unit, a sound picked up by the second satellite microphone unit, or both satisfy the predetermined second passing condition.

Referring to the example illustrated in FIG. 6, in a case where the microphone unit 24b in the second row is set as the main microphone unit, the microphone unit 24a in the first row may be set as the first satellite microphone unit, and the microphone unit 24c in the third row may be set as the second satellite microphone unit. In this case, the inspection-target speaker 22b may be determined as "passing" in the total determination in a case where: the individual determination result based on the microphone unit 24b in the second row is "PASS"; and the individual determination result based on the microphone unit 24a in the first row is "PASS", even if the individual determination result based on the microphone unit 24c in the third row is "FAIL". The inspection-target speaker 22b may be determined as "passing" in the total determination as well in a case where: the individual determination result based on the microphone unit 24b in the second row is "PASS"; and the individual determination result based on the microphone unit 24c in the third row is "PASS", even if the individual determination result based on the microphone unit 24a in the first row is "FAIL". The inspection-target speaker 22b may be determined as "passing" in the total determination as well in a case where all of the individual determination results based on the respective microphone units 24a, 24b, and 24c are "PASS".

Figure 7:
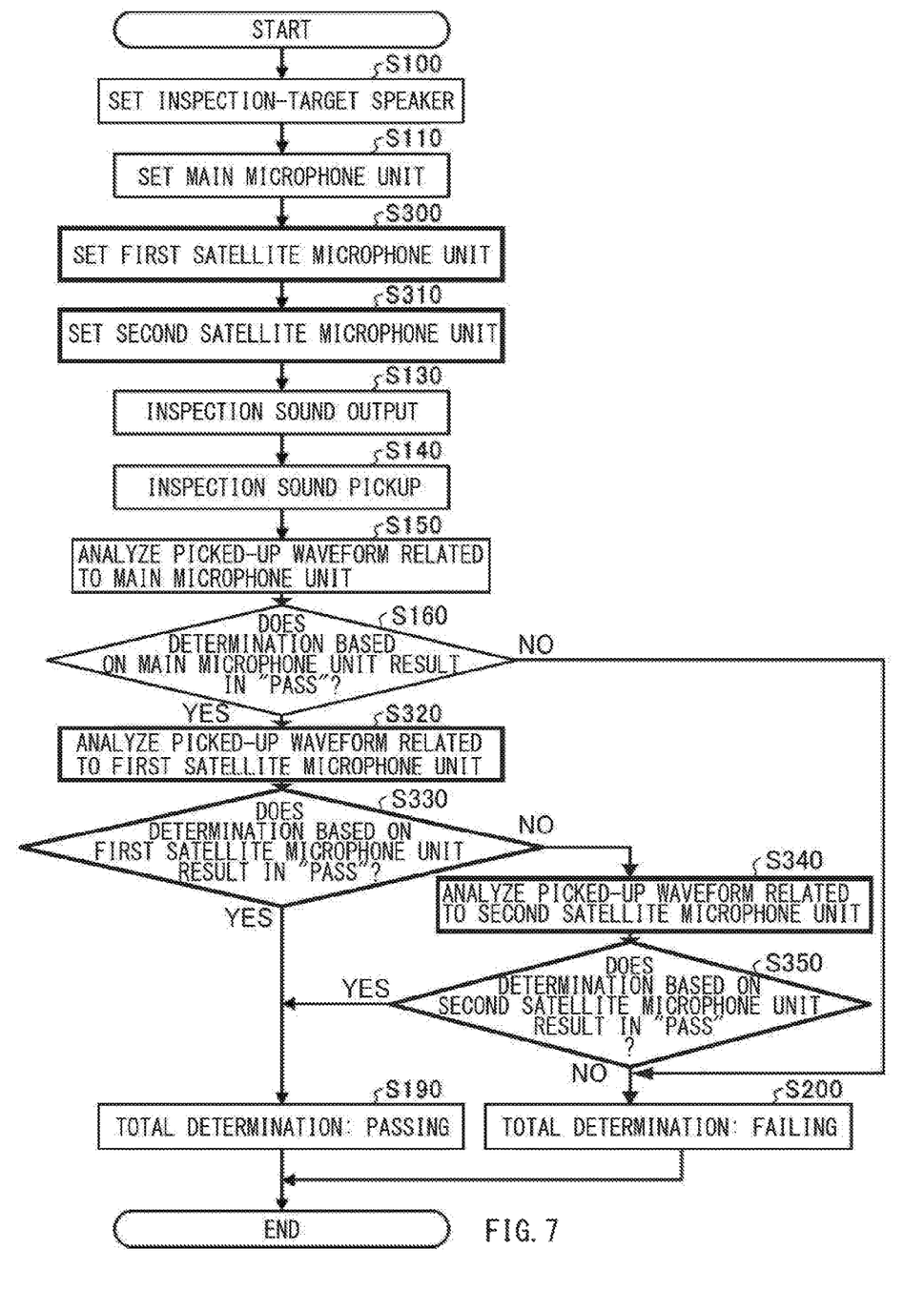
FIG. 7 is a flowchart describing an example of a flow of operation to be performed by the pass-fail determining unit according to one example embodiment.

FIG. 7 is a flowchart describing a flow of operation to be performed by the pass-fail determining unit 60 according to the second example embodiment. A thick frame in FIG. 7 indicates a process different from that in the flowchart illustrated in FIG. 5. In the following, the process different from that in the flowchart illustrated in FIG. 5 is described while the description of a process similar to that in the flowchart illustrated in FIG. 5 is omitted.

After setting the microphone unit 24b in the second row as the main microphone unit (step S110), the pass-fail determining unit 60 may set the microphone unit 24a in the first row as the first satellite microphone unit (step S300). Further, the pass-fail determining unit 60 may set the microphone unit 24c in the third row as the second satellite microphone unit (step S310).

After causing the output of the inspection sound and the pickup of the sounds to be performed, in a case where the individual determination based on the main microphone unit results in "PASS" (YES in step S160), the pass-fail determining unit 60 may analyze a picked-up waveform related to the first satellite microphone unit, and derive a parameter of the analyzed picked-up waveform (step S320).

Thereafter, the pass-fail determining unit 60 may determine whether the individual determination based on the first satellite microphone unit results in "PASS" (step S330). In one specific but non-limiting example, the pass-fail determining unit 60 may determine that the individual determination based on the first satellite microphone unit results in "PASS" in a case where the parameter of the picked-up waveform related to the first satellite microphone unit satisfies the second passing condition.

In a case where the individual determination based on the first satellite microphone unit results in "PASS" (YES in step S330), the pass-fail determining unit 60 may determine that the inspection-target speaker 22 passes (step S190).

In a case where the individual determination based on the first satellite microphone unit results in "FAIL" (NO in step S330), the pass-fail determining unit 60 may analyze a picked-up waveform related to the second satellite microphone unit, and derive a parameter of the analyzed picked-up waveform (step S340).

Thereafter, the pass-fail determining unit 60 may determine whether the individual determination based on the second satellite microphone unit results in "PASS" (step S350). In one specific but non-limiting example, the pass-fail determining unit 60 may determine that the individual determination based on the second satellite microphone unit results in "PASS" in a case where the parameter of the picked-up waveform related to the second satellite microphone unit satisfies the second passing condition.

In a case where the individual determination based on the second satellite microphone unit results in "PASS" (YES in step S350), the pass-fail determining unit 60 may determine that the inspection-target speaker 22 passes (step S190).

In a case where the individual determination based on the second satellite microphone unit results in "FAIL" (NO in step S350), the pass-fail determining unit 60 may determine that the inspection-target speaker 22 fails (step S200).

Accordingly, it is possible to improve accuracy of an inspection of the speaker 22 mounted on the vehicle 10 with the use of the inspection system 1 according to the second example embodiment as with the first example embodiment, compared to the comparative example.

Third Example Embodiment

According to the first and the second example embodiments, whether the inspection-target speaker 22 passes or fails may be determined on the basis of the main microphone unit and the satellite microphone unit (the first and the second satellite microphone units, according to the second example embodiment). According to the third example embodiment, the two or more sub microphone units may be used equally as the satellite microphone units.

Figure 8:
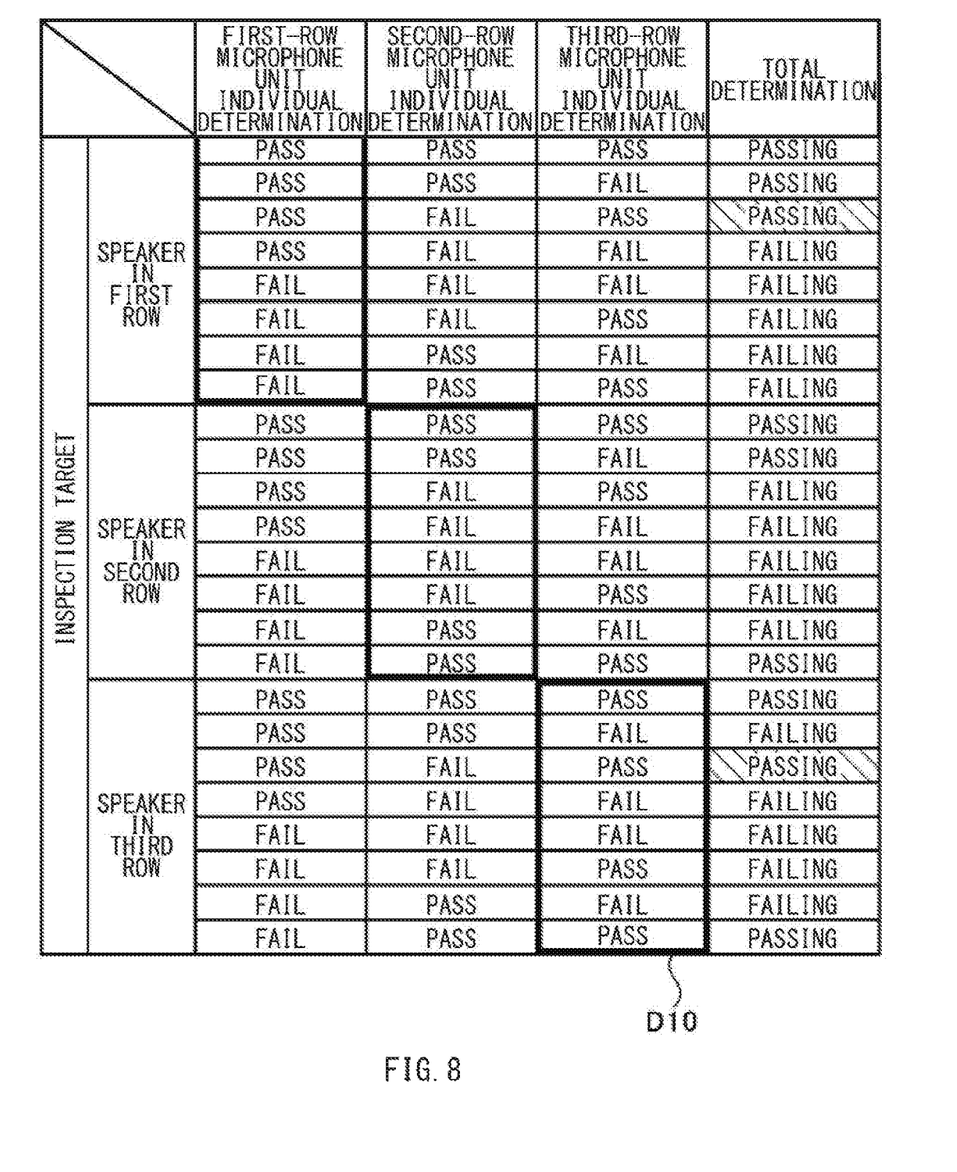
FIG. 8 is a diagram describing an example of a relationship between individual determination results based on the respective microphone units and a total determination result according to one example embodiment.

FIG. 8 describes an example of a relationship between individual determination results based on the respective microphone units 24 and a total determination result according to the third example embodiment. In FIG. 8, the thick solid-line frames D10, "PASS", and "FAIL" represent the same in those in FIG. 6, etc. A total determination result in FIG. 8 different from that in FIG. 6 is hatched.

According to the third example embodiment, the pass-fail determining unit 60 may determine that the inspection-target speaker 22 passes in a case where: the sound picked up by the main microphone unit satisfies the predetermined first passing condition; and the sound picked up by one or more satellite microphone units in one or more rows, between the satellite microphone units in the two or more rows, satisfy the predetermined second passing condition.

Accordingly, for example, in a case where: the speaker 22a in the first row is to be inspected; and the individual determination result based on the microphone unit 24a in the first row is "PASS", the inspection-target speaker 22a may be determined as "passing" in the total determination when the individual determination result based on the microphone unit 24c in the third row is "PASS", even if the individual determination result based on the microphone unit 24b in the second row is "FAIL".

Further, for example, in a case where: the speaker 22c in the third row is to be inspected; and the individual determination result based on the microphone unit 24c in the third row is "PASS", the inspection-target speaker 22c may be determined as "passing" in the total determination when the individual determination result based on the microphone unit 24a in the first row is "PASS", even if the individual determination result based on the microphone unit 24b in the second row is "FAIL".

Figure 9:
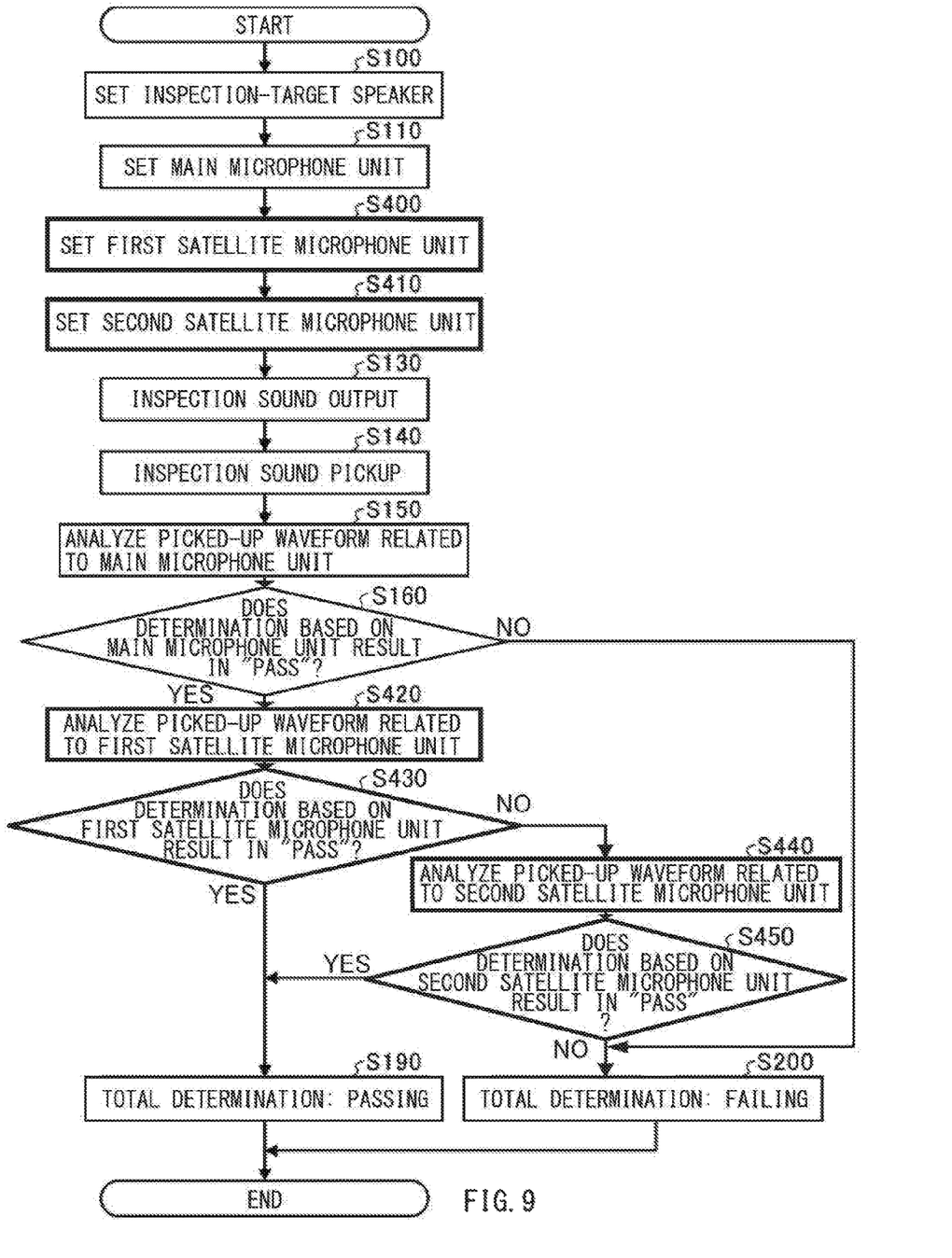
FIG. 9 is a flowchart describing an example of a flow of operation to be performed by the pass-fail determining unit according to one example embodiment.

FIG. 9 is a flowchart describing a flow of operation to be performed by the pass-fail determining unit 60 according to the third example embodiment. A thick frame in FIG. 9 indicates a process different from that in the flowchart illustrated in FIG. 7. In the following, the process different from that in the flowchart illustrated in FIG. 7 is described while the description of a process similar to that in the flowchart illustrated in FIG. 7 is omitted.

The pass-fail determining unit 60 may set one of the two sub microphone units as the first satellite microphone unit (step S400). For example, the pass-fail determining unit 60 may set one, of the two sub microphone units, that is disposed relatively on the front side as the first satellite microphone unit in step S400. Further, the pass-fail determining unit 60 may set the other of the two sub microphone units as the second satellite microphone unit (step S410). For example, the pass-fail determining unit 60 may set the other, of the two sub microphone units, that is disposed relatively on the rear side as the second satellite microphone unit in step S410.

In a case where the individual determination based on the main microphone unit results in "PASS" (YES in step S160), the pass-fail determining unit 60 may analyze a picked-up waveform related to the first satellite microphone unit (step S420). Thereafter, the pass-fail determining unit 60 may determine, on the basis of a parameter derived by the analysis of the picked-up waveform, whether the individual determination based on the first satellite microphone unit results in "PASS" (step S430). In a case where the individual determination based on the first satellite microphone unit results in "PASS" (YES in step S430), the pass-fail determining unit 60 may determine that the inspection-target speaker 22 passes (step S190).

In a case where the individual determination based on the first satellite microphone unit results in "FAIL" (NO in step S430), the pass-fail determining unit 60 may analyze a picked-up waveform related to the second satellite microphone unit (step S440). Thereafter, the pass-fail determining unit 60 may determine, on the basis of a parameter derived by the analysis of the picked-up waveform, whether the individual determination based on the second satellite microphone unit results in "PASS" (step S450). In a case where the individual determination based on the second satellite microphone unit results in "PASS" (YES in step S450), the pass-fail determining unit 60 may determine that the inspection-target speaker 22 passes (step S190). In a case where the individual determination based on the second satellite microphone unit results in "FAIL" (NO in step S450), the pass-fail determining unit 60 may determine that the inspection-target speaker 22 fails (step S200).

Accordingly, it is possible to improve accuracy of an inspection of the speaker 22 mounted on the vehicle 10 with the use of the inspection system 1 according to the third example embodiment as with the first and the second example embodiments, compared to the comparative example.

Whether to adopt the pass-fail determining method according to the third example embodiment or to adopt the pass-fail determining method according to the first or the second example embodiment may be selected as necessary in accordance with an inspection environment. Adopting the pass-fail determining method according to the third example embodiment allows a passing criterion to be less strict, compared to that according to the first or the second example embodiment.

According to the third example embodiment, the sub microphone units in two rows may be equally used as the satellite microphone units; however, this is non-limiting. In a case where the sub microphone units are present in three or more rows, the sub microphone units in the three or more rows may be equally used as the satellite microphone units.

Although some example embodiments of the technology have been described in the foregoing by way of example with reference to the accompanying drawings, the technology is by no means limited to the example embodiments described above. It should be appreciated that modifications and alterations may be made by persons skilled in the art without departing from the scope as defined by the appended claims. The technology is intended to include such modifications and alterations in so far as they fall within the scope of the appended claims or the equivalents thereof.

For example, according to any of the first to the third example embodiments, the vehicle 10 may include the seats 20 disposed in three rows; however, this is non-limiting. The seats 20 may be disposed not necessarily in three rows and may be disposed in two rows or in four or more rows. In any of these cases, the microphone unit 24 may be provided for a space in each of the rows. Moreover, the positions at which the microphone units 24 are disposed side by side in the vehicle 10 are not limited to those according to any of the first to the third example embodiments. For example, the microphone units 24 are not necessarily disposed side by side in the front-rear direction in the vehicle compartment 30, or the microphone units 24 are not necessarily disposed side by side for respective spaces in rows.

Moreover, in one example according to the first or the second example embodiment, the sub microphone units that are not set as the main microphone unit or the satellite microphone unit (the first or the second satellite microphone unit, in the example case according to the second example embodiment) for the inspection-target speaker 22 may be omitted or may not be caused to pick up the inspection sound.

Moreover, according to any of the first to the third example embodiments, the microphone unit 24 mounted on the vehicle 10 may be used to pick up the inspection sound; however, this is non-limiting. In an example case where the microphone unit 24 that is configured to serve as the main microphone unit or the satellite microphone unit (the first or the second satellite microphone unit, in the example case according to the second example embodiment) is not mounted on the vehicle 10, an inspection-dedicated microphone unit 24 may be disposed separately.

Moreover, according to any of the first to the third example embodiments, the audio unit 12 may be provided separately from the vehicle 10; however, this is non-limiting.

In one example, the audio unit 12 itself or each function of the audio unit 12 may be mounted on the vehicle 10.

Furthermore, the technology encompasses any possible combination of some or all of the various embodiments and the modifications described herein and incorporated herein. It is possible to achieve at least the following configurations from the above-described example embodiments of the technology.

(1)

An inspection system including:

two or more microphone units that are disposed side by side in a vehicle; and an inspection controller configured to cause an inspection-target speaker to output an inspection sound, and determine, on the basis of a sound picked up by a main microphone unit and a sound picked up by one or more satellite microphone units, whether the inspection-target speaker passes or fails, the inspection-target speaker being any of one or more speakers mounted on the vehicle, the main microphone unit being one, of the microphone units, that is disposed at a position corresponding to a position of the inspection-target speaker, the one or more satellite microphone units each being one of the microphone units excluding the main microphone unit.

(2)

The inspection system according to (1), in which the inspection controller is configured to determine that the inspection-target speaker passes in a case where:

the sound picked up by the main microphone unit satisfies a first passing condition; and at least one sound, out of the sound picked up by the one or more satellite microphone units, satisfies a second passing condition.

(3)

The inspection system according to (2), in which the one or more satellite microphone units include a plurality of satellite microphone units, and the inspection controller is configured to determine that the inspection-target speaker passes in a case where:

the sound picked up by the main microphone unit satisfies the first passing condition; and the sound picked up by one of the satellite microphone units that has a shortest distance to the main microphone unit satisfies a second passing condition.

(4)

The inspection system according to (2), in which the one or more satellite microphone units include a plurality of satellite microphone units including a first satellite microphone unit and a second satellite microphone unit, the first satellite microphone unit being adjacent to the main microphone unit in a first direction, the second satellite microphone unit being adjacent to the main microphone unit in a second direction, a distance from the main microphone unit to the first satellite microphone unit being equal to a distance from the main microphone unit to the second satellite microphone unit, and the inspection controller is configured to determine that the inspection-target speaker passes in a case where:

the sound picked up by the main microphone unit satisfies the first passing condition; and the sound picked up by the first satellite microphone unit, the sound picked up by the second satellite microphone unit, or both satisfy the second passing condition.

(5)

The inspection system according to any one of (2) to (4), in which the second passing condition has an allowable passing range that is greater than an allowable passing range of the first passing condition.

(6)

The inspection system according to any one of (1) to (5), in which the inspection controller is configured to equally set the microphone units excluding the main microphone unit as the satellite microphone units.

(7)

An inspection method including:

causing an inspection-target speaker to output an inspection sound, the inspection-target speaker being any of one or more speakers mounted on a vehicle; and determining, on the basis of a sound picked up by a main microphone unit and a sound picked up by one or more satellite microphone units, whether the inspection-target speaker passes or fails, the main microphone unit being one, of two or more microphone units, that is disposed at a position corresponding to a position of the inspection-target speaker, the microphone units being disposed side by side in the vehicle, the one or more satellite microphone units each being one of the microphone units excluding the main microphone unit.

The inspection controller 50 illustrated in FIG. 1 is implementable by circuitry including at least one semiconductor integrated circuit such as at least one processor (e.g., a central processing unit (CPU)), at least one application specific integrated circuit (ASIC), and/or at least one field programmable gate array (FPGA). At least one processor is configurable, by reading instructions from at least one machine readable non-transitory tangible medium, to perform all or a part of functions of the inspection controller 50 illustrated in FIG. 1. Such a medium may take many forms, including, but not limited to, any type of magnetic medium such as a hard disk, any type of optical medium such as a CD and a DVD, any type of semiconductor memory (i.e., semiconductor circuit) such as a volatile memory and a non-volatile memory. The volatile memory may include a DRAM and a SRAM, and the nonvolatile memory may include a ROM and a NVRAM. The ASIC is an integrated circuit (IC) customized to perform, and the FPGA is an integrated circuit designed to be configured after manufacturing in order to perform, all or a part of the functions of the inspection controller 50 illustrated in FIG. 1.

What is claimed is:

1. An inspection system comprising:

two or more microphone units that are disposed side by side in a vehicle; and an inspection controller configured to cause an inspection-target speaker to output an inspection sound, and determine, on a basis of a sound picked up by a main microphone unit and a sound picked up by one or more satellite microphone units, whether the inspection-target speaker passes or fails, the inspection-target speaker being any of one or more speakers mounted on the vehicle, the main microphone unit being one, of the microphone units, that is disposed at a position corresponding to a position of the inspection-target speaker, the one or more satellite microphone units each being one of the microphone units excluding the main microphone unit, wherein the inspection controller is configured to determine that the inspection-target speaker passes in a case where (i) the sound picked up by the main microphone unit satisfies a first passing condition and (ii) the sound picked up by the one or more satellite microphone units satisfies a second passing condition.

2. The inspection system according to claim 1, wherein the one or more satellite microphone units comprise a plurality of satellite microphone units, and the inspection controller is configured to determine that the inspection-target speaker passes in a case where:

the sound picked up by the main microphone unit satisfies the first passing condition; and the sound picked up by one of the satellite microphone units that has a shortest distance to the main microphone unit satisfies the second passing condition.

3. The inspection system according to claim 1, wherein the one or more satellite microphone units comprise a plurality of satellite microphone units including a first satellite microphone unit and a second satellite microphone unit, the first satellite microphone unit being adjacent to the main microphone unit in a first direction, the second satellite microphone unit being adjacent to the main microphone unit in a second direction, a distance from the main microphone unit to the first satellite microphone unit being equal to a distance from the main microphone unit to the second satellite microphone unit, and the inspection controller is configured to determine that the inspection-target speaker passes in a case where:

the sound picked up by the main microphone unit satisfies the first passing condition; and the sound picked up by the first satellite microphone unit, the sound picked up by the second satellite microphone unit, or both satisfy the second passing condition.

4. The inspection system according to claim 1, wherein the second passing condition has an allowable passing range that is greater than an allowable passing range of the first passing condition.

5. The inspection system according to claim 1, wherein the inspection controller is configured to equally set the microphone units excluding the main microphone unit as the satellite microphone units.

6. An inspection method comprising:

causing an inspection-target speaker to output an inspection sound, the inspection-target speaker being any of one or more speakers mounted on a vehicle; and determining, on a basis of a sound picked up by a main microphone unit and a sound picked up by one or more satellite microphone units, whether the inspection-target speaker passes or fails, the main microphone unit being one, of two or more microphone units, that is disposed at a position corresponding to a position of the inspection-target speaker, the two or more microphone units being disposed side by side in the vehicle, the one or more satellite microphone units each being one of the two or more microphone units excluding the main microphone unit, wherein the inspection controller is configured to determine that the inspection-target speaker passes in a case where (i) the sound picked up by the main microphone unit satisfies a first passing condition and (ii) the sound picked up by the one or more satellite microphone units satisfies a second passing condition.

\* \* \* \* \*